United States Patent [19]

Oishi

[11] Patent Number: 4,680,661
[45] Date of Patent: Jul. 14, 1987

[54] MAGNETIC DISK CARTRIDGE

[75] Inventor: Kengo Oishi, Kanagawa, Japan

[73] Assignee: Fuji Photo Film Co., Ltd., Japan

[21] Appl. No.: 813,762

[22] Filed: Dec. 26, 1985

[30] Foreign Application Priority Data

Jan. 7, 1985 [JP] Japan .................................. 60-726

[51] Int. Cl.$^4$ ............................................. G11B 23/03
[52] U.S. Cl. .................................... 360/133; 360/137
[58] Field of Search ................................ 360/133, 137

[56] References Cited

U.S. PATENT DOCUMENTS 3,668,658  6/1972  Flores ........................... 360/133 X
3,864,755  2/1975  Hargis ............................. 360/133

FOREIGN PATENT DOCUMENTS 2545091   4/1976  Fed. Rep. of Germany .
48-65765  9/1973  Japan .
49-66706  6/1974  Japan .
52-18707  2/1977  Japan .
55-163244 12/1980 Japan .

OTHER PUBLICATIONS

IBM T.D.B., vol. 23, #5, Oct. 1980; "Lubricated Diskette Liner Wipe"; Bothun, Gregory, Smith; pp. 2044-2045.

Primary Examiner—A. J. Heinz
Attorney, Agent, or Firm—Gerald J. Ferguson, Jr.; Ronni S. Malamud; Michael P. Hoffman

[57] ABSTRACT

A magnetic disk cartridge comprises a case, a flexible magnetic disk sheet rotatably housed in the case, and at least one liner secured to an inner wall surface of the case facing the magnetic disk sheet so that the liner contacts the magnetic disk sheet. The liner is constituted by a nonwoven fabric for contact with the magnetic disk sheet, and a chemical dust attraction layer secured to the inner wall surface of the case.

5 Claims, 3 Drawing Figures

F I G. 2
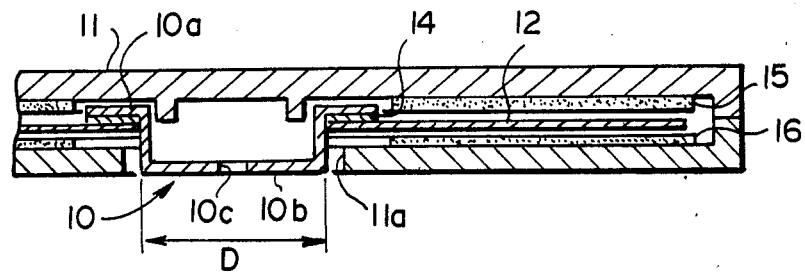
F I G. 3
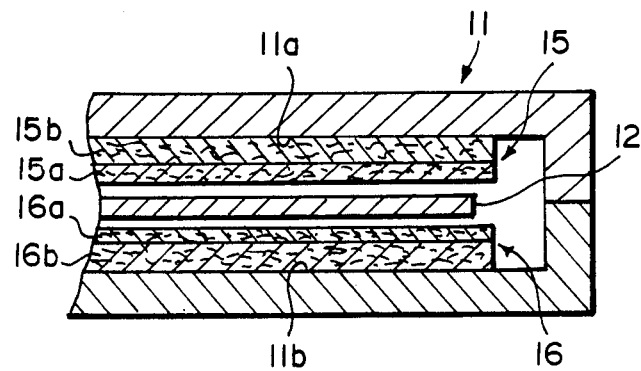

MAGNETIC DISK CARTRIDGE

BACKGROUND OF THE INVENTION

1. Field of the Invention

This invention relates to a magnetic disk cartridge comprising a small-diameter, very thin flexible magnetic disk sheet housed in a case and rotated at a high speed for magnetic recording and reproduction. This invention particularly relates to a magnetic disk cartridge provided with an improved liner for removing dust, dirt, or the like from the surface of the magnetic disk sheet.

2. Description of the Prior Art

Floppy disks are widely used as recording media for computers because they are easy to handle and low in cost. The floppy disk comprises a disk-like base made of a flexible polyester sheet or the like, and magnetic material layers overlaid on opposite surfaces of the disk-like base. The floppy disk is rotated at a high speed for magnetically recording information on the magnetic material layers by use of a magnetic head. On the other hand, by utilizing the aforesaid advantages of the floppy disk and the advantage that a magnetic recording medium has over silver halide photographic films in that the magnetic recording medium can be reused, it has been proposed to use a magnetic disk having a size smaller than the size of the floppy disk as an image recording medium in still cameras. The magnetic disk used for still cameras comprises a small-diameter, very thin magnetic disk sheet rotatably housed in a small case. The combination of the magnetic disk sheet with the case is called a magnetic disk cartridge.

In general, the aforesaid magnetic disk cartridge is provided with a liners for removing dust, dirt or the like from the surfaces of the magnetic disk sheet. The liner has heretofore been fabricated of a rayon-polyester mixed nonwoven fabric or the like, and secured to an inner wall surface of the case facing the magnetic disk sheet so that it slightly contacts the surface of the magnetic disk sheet. Therefore, when the magnetic disk sheet is rotated, the whole surface thereof is cleaned by the liner.

However, though the conventional liner fabricated of a nonwoven fabric exhibits a high effect of picking up dust, dirt or the like from the surface of the magnetic disk sheet, it readily releases dust, dirt or the like when the magnetic disk cartridge is subjected to impact. This is because the nonwoven fabric is constituted by fibers thermally fused together, and dust, dirt or the like is merely physically entangled between the fibers. As a result, dust, dirt or the like is readily released by impact from the nonwoven fabric.

Dust, dirt or the like released from the liner and sticking to the magnetic disk sheet cannot immediately be removed by the liner from the magnetic disk sheet. Therefore, particularly in the case of high-density recording on the magnetic disk sheet, drop-out is often caused by dust, dirt or the like.

SUMMARY OF THE INVENTION

The primary object of the present invention is to provide a magnetic disk cartridge provided with a liner which does not readily release dust, dirt or the like.

Another object of the present invention is to provide a magnetic disk cartridge that is free from failures caused by dust, dirt or the like.

The present invention provides a magnetic disk cartridge having a case, a flexible magnetic disk sheet rotatably housed in the case, and at least one liner secured to an inner wall surface of the case facing the magnetic disk sheet so that the liner contacts the magnetic disk sheet, wherein said liner is constituted by a nonwoven fabric for contact with said magnetic disk sheet, and a chemical dust attraction layer secured to the inner wall surface of said case.

In the magnetic disk cartridge of the present invention, since dust, dirt or the like on the surface of the magnetic disk sheet is strongly attracted by the chemical dust attraction layer, the dust, dirt or the like is not released from the liner onto the surface of the magnetic disk sheet. Accordingly, the surface of the magnetic disk sheet is always maintained clean, and no drop-out is caused by dust, dirt or the like.

The chemical dust attraction layer should preferably be constituted by a cloth impregnated with an emulsion prepared by mixing a surface-active agent such as nonionic or cationic surface-active agent, mineral oil and water.

When the aforesaid liner is used, dust, dirt or the like sticking to the magnetic disk sheet is strongly attracted by the chemical dust attraction layer via gaps between fibers of the nonwoven fabric contacting the magnetic disk sheet. Therefore, even if the magnetic disk cartridge is subjected to impact, the dust, dirt or the like attracted by the liner will not be readily released from the liner. Also, since the nonwoven fabric of the liner contacts the magnetic disk sheet and the chemical dust attraction layer does not directly contact the magnetic disk sheet, the magnetic disk sheet is not stained by the mineral oil and other constituents of the chemical dust attraction layer. When the nonwoven fabric is fabricated of an oil-repellent material, it is possible to prevent the mineral oil of the chemical dust attraction layer from permeating through the nonwoven fabric and staining the magnetic disk sheet.

BRIEF DESCRIPTION OF THE DRAWINGS

FIGS. 1 and 2 are an exploded perspective view and a sectional side view, respectively, showing an embodiment of the magnetic disk cartridge in accordance with the present invention, and FIG. 3 is a sectional side view showing the liner of the magnetic disk cartridge of FIG. 1.

DESCRIPTION OF THE PREFERRED EMBODIMENTS

Figure 1:
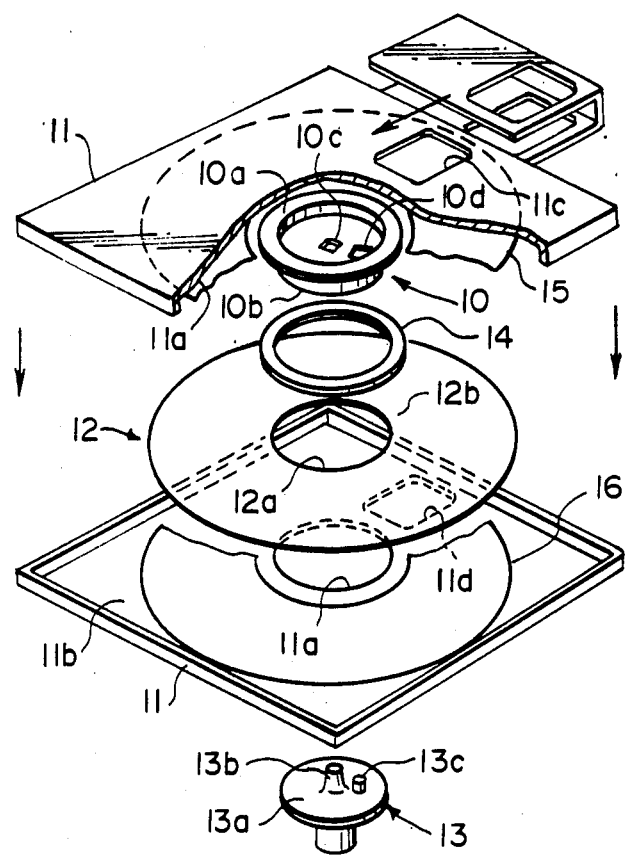

The present invention will hereinbelow be described in further detail with reference to the accompanying drawings.

FIGS. 1 and 2 show an embodiment of the magnetic disk cartridge in accordance with the present invention. A hat-like center core 10 is rotatably supported in a case 11, and an inner circumferential edge portion 12b of a magnetic disk sheet 12 having a circular hole 12a at its center is secured to a flange portion 10a of the center core 10. An end face 10b of the center core 10 is exposed as a magnetic chuck surface from an aperture 11a at the center of the case 11, and magnetically chucked to a magnetic chuck portion 13a of a rotation drive shaft 13 of the floppy disk driver. Also, engagement pins 13b and 13c of the drive shaft 13 are engaged with engagement holes 10c and 10d of the end face 10b to rotate the magnetic disk sheet 12 inside of the case 11. Normally, the inner circumferential edge portion 12b of the magnetic disk sheet 12 is secured by a ring-like double-faced adhesive member 14 to the flange portion 10a.

Liners 15 and 16 formed, for example, in an approximately ring-like shape, are respectively secured to inner wall surfaces 11a and 11b of the case 11 facing the magnetic disk sheet 12. Also, the case 11 is provided with magnetic head insertion apertures 11c and 11d, and the liners 15 and 16 are provided with apertures (not shown) matching the head insertion apertures 11c and 11d. When the magnetic disk sheet 12 is rotated inside of the case 11, the magnetic head (not shown) of the recording and/or reproducing apparatus contacts the magnetic disk sheet 12 via the head insertion aperture 11c or 11d, and records information on the magnetic disk sheet 12 or reads the information therefrom. As shown in FIG. 3, the liner 15 has a dual layer configuration comprising a nonwoven fabric 15a which contacts the magnetic disk sheet 12, and a chemical dust attraction layer 15b secured to the inner wall surface 11a of the case 11. Similarly, the liner 16 on the opposite side comprises a nonwoven fabric 16a and a chemical dust attraction layer 16b. The nonwoven fabrics 15a and 16a are formed by thermally fusing fibers of an oil-repellent material such as polyethylene or Teflon comparatively coarsely and generally thinly. On the other hand, the chemical dust attraction layers 15b and 16b comprise a cloth impregnated with an emulsion prepared by mixing a surface-active agent such as a nonionic or cationic surface-active agent, a mineral oil and water. The configuration of the chemical dust attraction layers 15b and 16b is basically the same as the configuration of a known chemical duster. The chemical dust attraction layer of this type is described, for example, in Japanese Unexamined Patent Publication Nos. 48(1973)-65765, 49(1974)-66706, 52(1977)-18707 and 55(1980)-163244.

When the magnetic disk cartridge is loaded into the recording and/or reproducing apparatus and the magnetic disk sheet 12 is rotated inside of the case 11, dust, dirt or the like sticking to the surfaces of the magnetic disk sheet 12 are attracted by the chemical dust attraction layers 15b and 16b via gaps between fibers of the nonwoven fabrics 15a and 16a. Thus the magnetic disk sheet 12 is cleaned. Since the chemical dust attraction layers 15b and 16b strongly pick up dust, dirt or the like by chemical attraction force, the dust, dirt or the like thus picked up is not released from the liners 15 and 16 onto the magnetic disk sheet 12 even if the magnetic disk cartridge removed from the recording and/or reproducing apparatus should be subjected to impact. Also, since the nonwoven fabrics 15a and 16a respectively intervene between the magnetic disk sheet 12 and the chemical dust attraction layers 15b and 16b, the magnetic disk sheet 12 is not stained by the mineral oil and other constituents contained in the chemical dust attraction layers 15b and 16b. In this embodiment, since the nonwoven fabrics 15a and 16a are constituted by an oil-repellent material, the mineral oil does not permeate through the nonwoven fabrics 15a and 16a to stain the magnetic disk sheet 12.

I claim:

1. A magnetic disk cartridge having a case, a flexible magnetic disk sheet rotatably housed in the case, and at least one liner secured to an inner wall surface of the case facing the magnetic disk sheet so that the liner contacts the magnetic disk sheet, wherein said liner is constituted by two superimposed layers, one of the layers being a nonwoven fabric layer for contact with said magnetic disk sheet, and the other layer being a chemical dust attraction layer secured to the inner wall surface of said case.

2. A magnetic disk cartridge as defined in claim 1 wherein said chemical dust attraction layer is constituted by a cloth impregnated with an emulsion prepared by mixing a surface-active agent, a mineral oil and water.

3. A magnetic disk cartridge as defined in claim 1 or 2 wherein said nonwoven fabric layer is constituted by an oil-repellent material.

4. A magnetic disk cartridge as defined in claim 1 or 2 wherein said liner is formed in an approximately ring-like shape and provided with an aperture matching an aperture of said case for magnetic head insertion.

5. A magnetic disk cartridge as defined in claim 2 wherein said surface-active agent is selected from the group consisting of nonionic surface-active agents and cationic surface-active agents.

* * * * *